US011130613B2

(12) United States Patent
Sangiacomo

(10) Patent No.: US 11,130,613 B2
(45) Date of Patent: Sep. 28, 2021

(54) CONTAINER ADAPTER

(71) Applicant: Corey Louis Sangiacomo, Ukiah, CA (US)

(72) Inventor: Corey Louis Sangiacomo, Ukiah, CA (US)

(*) Notice: Subject to any disclaimer, the term of this patent is extended or adjusted under 35 U.S.C. 154(b) by 0 days.

(21) Appl. No.: 16/154,435

(22) Filed: Oct. 8, 2018

(65) Prior Publication Data
US 2020/0108975 A1 Apr. 9, 2020

(51) Int. Cl.
B65D 21/02 (2006.01)
A47J 42/24 (2006.01)
B02C 18/08 (2006.01)

(52) U.S. Cl.
CPC .......... B65D 21/0228 (2013.01); A47J 42/24 (2013.01); B02C 18/08 (2013.01); B65D 2539/001 (2013.01)

(58) Field of Classification Search
CPC .... B65D 41/04; B65D 41/06; B65D 21/0228; B65D 21/0209; B65D 1/023; B65D 1/0246; B65D 51/24; B65D 51/18; A47J 42/24; A47J 42/22; A47J 42/20; A47J 42/16; A47J 42/14; A47J 42/06; A47J 42/04; B02C 18/08; B02C 18/10; B65B 3/04
USPC .... 215/200, 44, 43, 329, 228; 220/212, 293, 220/288, 254.8, 259.3, 256.1; 241/169.1; 141/2
See application file for complete search history.

(56) References Cited

U.S. PATENT DOCUMENTS 2,666,023 A * 1/1954 Schaaber ............... C25D 11/06
  205/107
5,455,180 A * 10/1995 Reid ................... B01L 3/50825
  215/247
2011/0226770 A1* 9/2011 Tiesberger ......... B65D 51/2864
  220/254.8

FOREIGN PATENT DOCUMENTS

GB        788524 A * 1/1958 .............. A47J 42/04

* cited by examiner

Primary Examiner — Robert J Hicks
(74) Attorney, Agent, or Firm — Lamon Patent Services; Cynthia S. Lamon

(57) ABSTRACT

An adapter has a circular body having an outer diameter and a height, a counter-bore concentric with the outer diameter, implemented in a lower extremity of the body, having a first inner diameter from the lowest point of the body to an internal horizontal shoulder, a through bore having a second inner diameter concentric with the outer diameter from an upper extremity of the body to the level of the internal horizontal shoulder, a male thread implemented at the upper extremity of the body adapted to engage a female thread of a commercially-available herb grinder, and a course female thread implemented in the counter-bore from the lower extremity of the body to the internal horizontal shoulder, the course female thread of a form to intimately engage threads under a rim of a regular-mouth Mason jar.

8 Claims, 2 Drawing Sheets

CONTAINER ADAPTER

BACKGROUND OF THE INVENTION

1. Field of the Invention

The present invention is in the technical area of cannabis product preparation and storage, and pertains more particularly to an adapter for joining a cannabis herb grinder to a Mason jar, to shred cannabis leaves into the Mason jar for protection and storage.

2. Description of Related Art

The skilled person will understand that there a many sorts of storage containers that are, and that might be used for storing shredded herb. Such product is stored in zip-lock bags, on occasion in plain jars, and in many other containers. Many such storage solutions, however, do not keep the product from too much or too little moisture, or from other environmental effects that may be detrimental. The inventors have discovered that well-known Mason jars are ideal for shredded herb storage, but that there is a problem with shredding or grinding the herb, and transferring same to the Mason jar for storage. Some herb components may be displaced or lost in the process, and may get scattered or dispersed.

What is clearly needed is a adapter that securely and smoothly joins an herb grinder to a Mason jar.

BRIEF SUMMARY OF THE INVENTION

In one embodiment of the invention an adapter is provided, comprising a circular body having an outer diameter and a height, a counter-bore concentric with the outer diameter, implemented in a lower extremity of the body, having a first inner diameter from the lowest point of the body to an internal horizontal shoulder, a through bore having a second inner diameter concentric with the outer diameter from an upper extremity of the body to the level of the internal horizontal shoulder, a male thread implemented at the upper extremity of the body adapted to engage a female thread of a commercially-available herb grinder, and a course female thread implemented in the counter-bore from the lower extremity of the body to the internal horizontal shoulder, the course female thread of a form to intimately engage threads under a rim of a regular-mouth Mason jar.

In one embodiment of the adapter the second inner diameter of the body of the adapter is about 60 mm, which is the inner diameter of an upper rim of a regular-mouth Mason jar, such that, with the adapter engaged to the Mason jar the inner horizontal shoulder contacts the upper rim of the regular-mouth Mason jar. Also, in one embodiment the body of the adapter is aluminum, and outer surfaces of the aluminum body are black-anodized. In one embodiment the body of the adapter is aluminum, and outer surfaces are anodized to individual ones of several different colors. In one embodiment the outer diameter is greater than 2.5 inches from the lower extremity to at least one-half of the height, and an upper portion above one-half the height is tapered toward a center of the circular body. And in one embodiment the outer diameter of the circular body is textured to provide a sure gripping surface.

In another aspect of the invention a method for catching and storing shredded herb is provided, comprising engaging male threads at an upper extremity of a body of an adapter to compatible internal threads at a lower extremity of a commercially available herb grinder, engaging course female threads implemented in a counter-bore from a lower extremity of the body up to an inner horizontal shoulder to threads under a rim of a regular-mouth Mason jar, such that the rim of the Mason jar firmly contacts the horizontal shoulder of the body of the commercially-available herb grinder, and operating the commercially-available herb grinder, causing shredded herb to fall through the adapter into the regular-mouth Mason jar.

In one embodiment the method further comprises disengaging the course threads of the adapter from the course threads under the rim of the regular-mouth Mason jar, removing the adapter together with the commercially-available herb grinder, and closing the regular-mouth Mason jar with a conventional lid and threaded band.

DETAILED DESCRIPTION OF THE INVENTION

Figure 1:
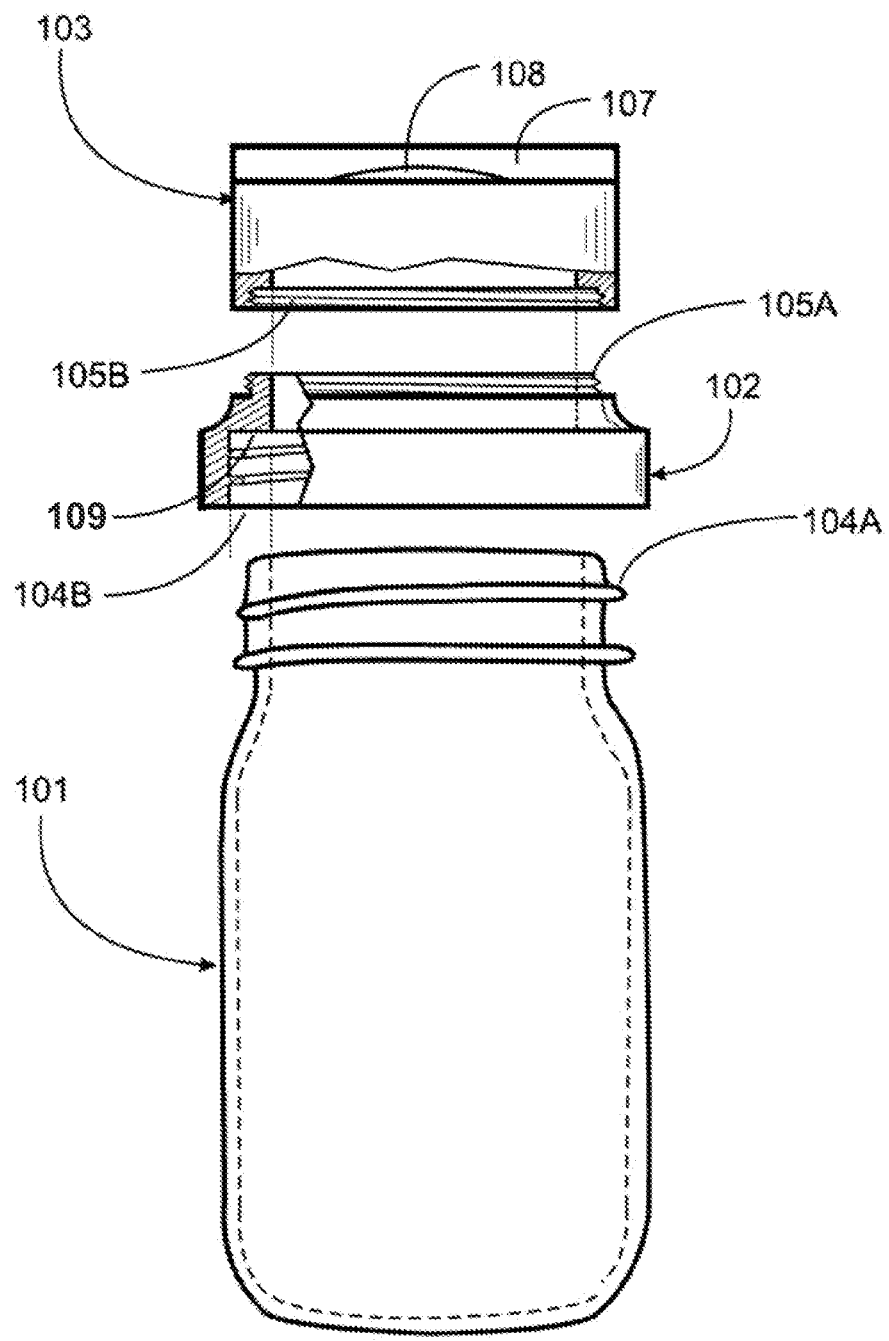
FIG. 1 is an elevation view of a wide-mouth Mason jar, an adapter according to an embodiments of the present invention and a commercially-available herb grinder.

FIG. 1 is an elevation view of a wide-mouth Mason jar 101, and adapter 102 according to an embodiments of the present invention and a commercial herb grinder 103. A Mason jar, named after John Landis Mason who first invented and patented it in 1858, is a molded glass jar used in home canning to preserve food. The jar's mouth has a screw thread on its outer perimeter to accept a metal ring, called a band in the art. The band, when screwed down, presses a separate stamped, tin-plated steel disc-shaped lid against the jar's rim. An integral rubber ring on the underside of the lid creates a hermetic seal. The bands and lids usually come with new jars, but they are also sold separately. While the bands are reusable, the lids are intended for single use when canning.

Largely supplanted by other products and methods for commercial canning, such as tin cans and plastic containers, glass jars and metal lids are still commonly used in home canning. Mason jars are also called Ball jars, in reference to the Ball Corporation, an early and prolific manufacturer of glass canning jars; fruit jars for a common content; and glass canning jars, which is a generic term reflecting their material and purpose. The present inventor considers that quality of hermetic sealing to be advantageous for keeping shredded herb fresh and flavorful.

Mason jar 101 in this example is a regular-mouth jar with a molded-in thread system 104A that is particular and common to all regular-mouth-mouth Mason jars regardless of brand and manufacture. A regular-mouth Mason jar has an inside diameter at the mouth of 2⅜ inches (60 mm), and an outside diameter at the rim of 2¾ inches (70 mm). A wide-mouth Mason jar (not shown) has an inside diameter at the mouth of 3 inches (76 mm), and an outside diameter at the rim of 3⅜ inches (86 mm).

The molded male thread 104A is a very course thread, as may be seen, requiring about two turns to fully engage a standard rim. A commercially-available grinder 103 is shown in FIG. 1 on a common centerline with Mason jar 101. In this embodiment, the commercial herb grinder has an overall diameter of 2⅛ inches. One example of a known herb grinder is Santa Cruz Shredder of Santa Cruz Calif.

Grinders are typically shown assembled to a lower container that is provided for catching and storing shredded herb. These storage containers are typically not hermetically sealed or even partially airtight. Grinder 103 of FIG. 1 is shown without the lower container, and female threads in the lower extremity of the grinder shown as female thread 105B, are originally provided to engage the lower container. Lid 107 is typically held closed in this example by a rare-earth magnet, and may be opened by pulling upward at a finger slot 108. This lid, although not pertinent to the present invention, engages the grinder in a manner that twisting the lid relative to the body of the grinder causes the shredding action.

Between the Mason jar and the grinder an adapter 102 is shown, specifically adapted to engage the herb grinder 103 to the Mason jar 101. Adapter 102 has a male thread 105A of about 2 inch OD, compatible with female tread 1 05B of the grinder. Adapter 102 has an inner diameter from an upper extremity down to a shoulder 109 the same as the inner diameter of the Mason jar, which is 2⅜ inches (60 mm). Downward from shoulder 109 inside the adapter, as shown in partial section, is a female thread 104B compatible with male thread 104A at the upper extremity of the Mason jar.

In practice of the invention a user will typically engage grinder 103 with adapter 102 by engaging threads 105A and 105B, then, with lid 107 open, load herb into the grinder. Then the user closes lid 107, and engages adapter 102, with the loaded grinder engaged, to Mason jar 101. The user may then rotate lid 107, shredding herb that was previously loaded, with shredded herb falling into the Mason jar. The grinder may be reloaded and operated as many times as desired, and when finished, or when the Mason jar is full, the adapter, with grinder, may be disengaged from the Mason jar, which may be closed with a conventional sealing lid and sealed with a conventional threaded band. One important aspect of the adapter, when engaged with the herb grinder 103 and the mason jar 101, is that when tightened, a smooth, flush surface inner wall is provided from the grinder to the jar so that no particulate matter is caught or retained in any seams where the herb grinder meets the adapter and where the adapter meets the jar.

Adapters such as 102 shown may be manufactured of aluminum and black anodized aluminum or stainless steel, for example. Other materials may be used for manufacturing the adapter 102, including hardened plastics, and composite materials such as those using carbon fiber and fiberglass reinforcements in plastics and epoxy material. Other reinforced plastic material may include polyester, vinyl ester, and other thermosetting resins used for glass-reinforced plastic.

Other colors such as gold and blue may be provided in anodized aluminum as well. Other materials may be used, like high molecular count polymers for example, in many different colors. Other metals may be used, such as titanium for example. There may be different textures applied to the outer surface of adapters as aid for a user's grip, or in some cases just for aesthetic effect. In some cases a user may elect to use a rubber-like seal between the mason jar and the adapter. There are many possibilities.

Figure 2:
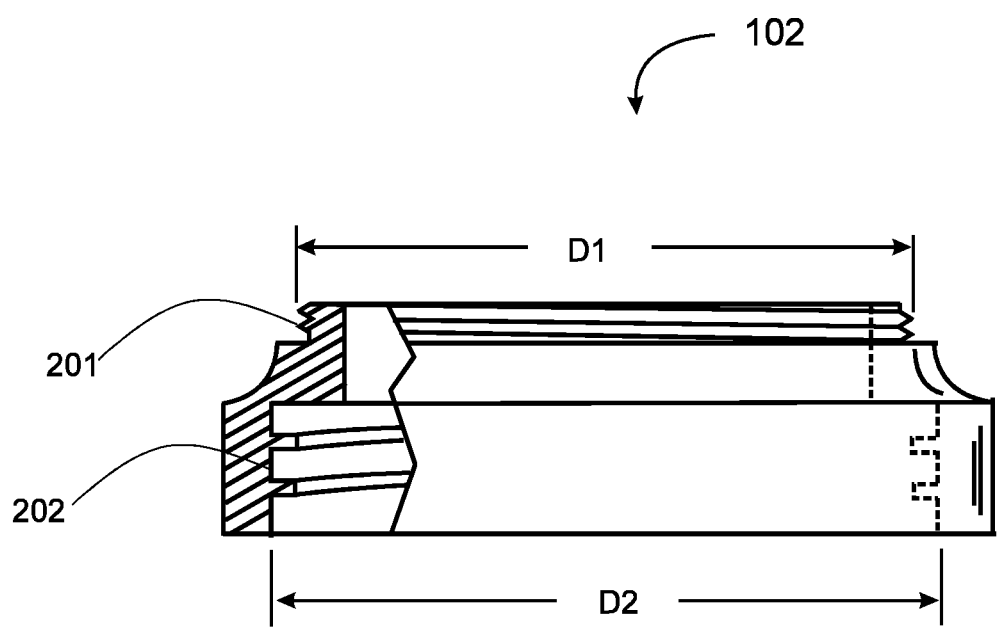
FIG. 2 is an elevation view of the stand-alone adapter showing separate thread dimensions on opposite ends of the adapter.

FIG. 2 is an elevation view showing specific dimension differences between the threads on opposing sides of the adapter. In this embodiment a cutaway clearly depicts the thread positions. A dimension of a diameter D1 of threads 201 demonstrate a width of threads enabled to connect to the grinder. At the opposing side of adapter 102 shows a dimension D2 for the threads 202 adapted to connect to a regular mouth jar, such as a mason jar. One with skill in the art understands, as shown, the threads 201 have a smaller dimension than threads 202. Additionally the thread pitch and thread per inch is viewable in FIG. 2. Standard jar threads are 5, 6, 8, and 12 threads per inch. The adapter may be manufactured to accommodate these standard pitches, while the thread pitch for the grinder may be more or less threads per inch than the standards for jars.

Another embodiment provides an adapter wherein a grinder may be attached to the adapter by means other than implementing male and female threads. For example, the grinder may have a supple skirt of pliable rubber or silicon material fit flush along an interior surface at a location of existing threads 105B (FIG. 1). In this embodiment a secure connection may be accomplished by using force to push the grinder onto the adapter 102 wherein the skirt of material grabs and holds the adapter at an area where threads 105A are located. The threads 105A may be maintained in place in this embodiment, or the threads may be removed leaving a rim of adapter material that includes the diameter D1.

The skilled person will understand that the embodiments taught in enabling detail herein are, in fact, exemplary, and there may well be other variations, not discussed in detail, that will still lie within the scope of the invention. An adapter of the sort taught herein may have different threads at the upper extremity to accommodate grinders of different make and model. The invention is limited only by the scope of the claims below.

I claim:

1. An adapter, comprising:
   a circular body having an outer diameter and a height;
   a counter-bore concentric with the outer diameter, implemented in a lower extremity of the body, having a first inner diameter from the lowest point of the body to an internal horizontal shoulder;
   a through bore having a second inner diameter concentric with the outer diameter from an upper extremity of the body to the level of the internal horizontal shoulder;
   a male thread implemented at an outer surface and adjacent to an upper edge of the upper extremity of the body adapted to engage a female thread of a commercially-available herb grinder; and
   a course female thread implemented in the counter-bore from the lower extremity of the body to the internal horizontal shoulder, the course female thread of a form to intimately engage threads under a rim of a regular-mouth Mason jar;
   wherein the adapter only makes contact with the commercially available herb grinder at the male thread at the upper edge of the adapter and only makes contact with the regular-mouth Mason jar at the course female thread.

2. The adapter of claim 1 wherein the second inner diameter of the body of the adapter is substantially 60 mm, which is the inner diameter of an upper rim of the regular-mouth Mason jar, such that, with the adapter engaged to the Mason jar the inner horizontal shoulder contacts the upper rim of the regular-mouth Mason jar.

3. The adapter of claim 1 wherein the body of the adapter is aluminum, and outer surfaces of the aluminum body are black-anodized.

4. The adapter of claim 1 wherein the body of the adapter is aluminum, and outer surfaces are anodized to individual ones of several different colors.

5. The adapter of claim 1 wherein the outer diameter is greater than 2.5 inches from the lower extremity to at least one-half of the height, and an upper portion above one-half the height is tapered toward a center of the circular body.

6. The adapter of claim 1 wherein the outer diameter of the circular body is textured to provide a sure gripping surface.

7. A method for catching and storing shredded herb, comprising:
   engaging male threads at an upper extremity of a body of an adapter to compatible internal threads at a lower extremity of a commercially available herb grinder;
   engaging course female threads implemented in a counter-bore from a lower extremity of the body up to an inner horizontal shoulder to threads under a rim of a regular-mouth Mason jar, such that the rim of the Mason jar firmly contacts the horizontal shoulder of the body of the commercially-available herb grinder, wherein the adapter only makes contact with the commercially available herb grinder at the male thread at the upper edge of the adapter and only makes contact with the regular-mouth mason jar at the course female thread, and operating
   the commercially-available herb grinder, causing shredded herb to fall through the adapter into the regular-mouth Mason jar.

8. The method of claim 7 further comprising disengaging the course threads of the adapter from the course threads under the rim of the regular-mouth Mason jar, removing the adapter together with the commercially-available herb grinder, and closing the regular-mouth Mason jar with a conventional lid and threaded band.

\* \* \* \* \*